United States Patent [19]

Ruyak

[11] 4,382,578
[45] May 10, 1983

[54] MAGNETICALLY ACTUATED RISING STEM VALVE

[75] Inventor: Robert F. Ruyak, Erie, Pa.

[73] Assignee: Autoclave Engineers, Inc., Erie, Pa.

[21] Appl. No.: 174,805

[22] Filed: Aug. 4, 1980

Related U.S. Application Data

[62] Division of Ser. No. 39,899, May 17, 1979, Pat. No. 4,274,444.

[51] Int. Cl.$^3$ .............................................. F16K 31/11
[52] U.S. Cl. ..................................... 251/65; 251/133; 251/130; 403/DIG. 1
[58] Field of Search .......................... 251/65, 133, 130; 137/630.14, 630.15; 310/156; 403/DIG. 1

[56] References Cited

U.S. PATENT DOCUMENTS

| | | | |
|---|---|---|---|
| 2,289,574 | 7/1942 | Carlson | 251/65 |
| 2,589,188 | 3/1952 | DeCraene et al. | 251/65 |
| 3,355,140 | 11/1967 | Anderson | 251/65 |
| 4,138,617 | 2/1979 | Sudler | 310/156 X |

Primary Examiner—Arnold Rosenthal
Attorney, Agent, or Firm—Webb, Burden, Robinson & Webb

[57] ABSTRACT

This invention relates to a rising stem valve that is magnetically actuated. A driven magnet assembly is rotatably supported in a nonmagnetic pressurizable bonnet fixed to the main valve body. The driven magnet assembly preferably comprises rare earth cobalt magnets defining an even number of north and south poles. A cylindrical holder coaxial with and surrounding said tubular bonnet is rotatably secured thereto. The holder carries driving magnets, preferably rare earth cobalt magnets with an even number of north and south poles. Rotation of the holder results in rotation of the driven magnet assembly. A valve stem is connected to the driven magnet assembly in a manner such that turning of the driven magnet assembly raises and lowers the stem which in turn opens and closes the valve.

1 Claim, 3 Drawing Figures

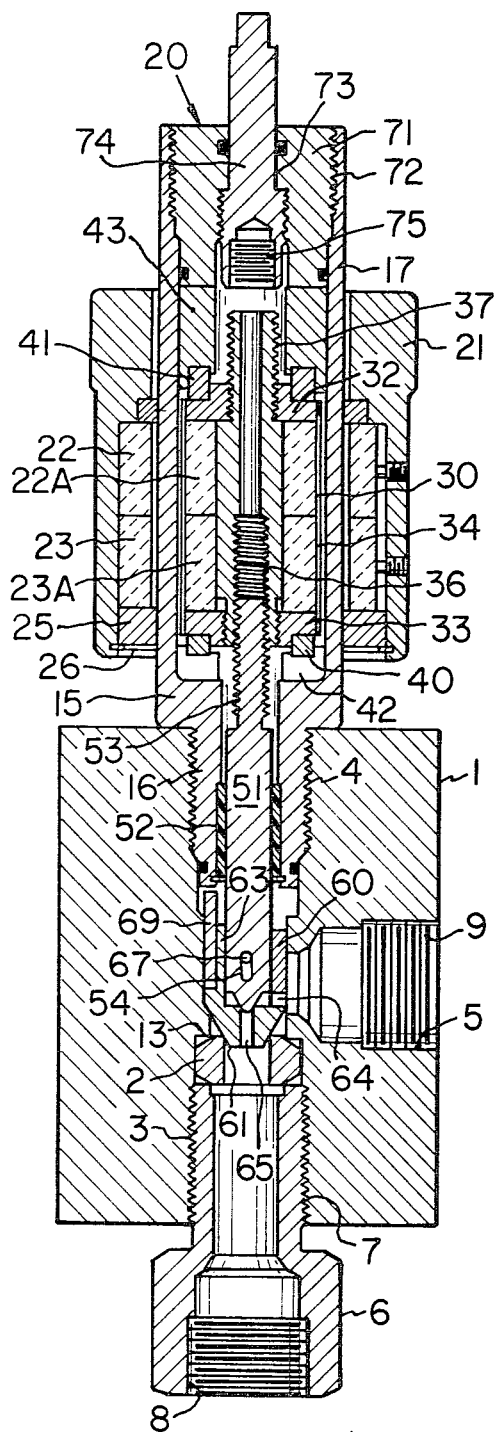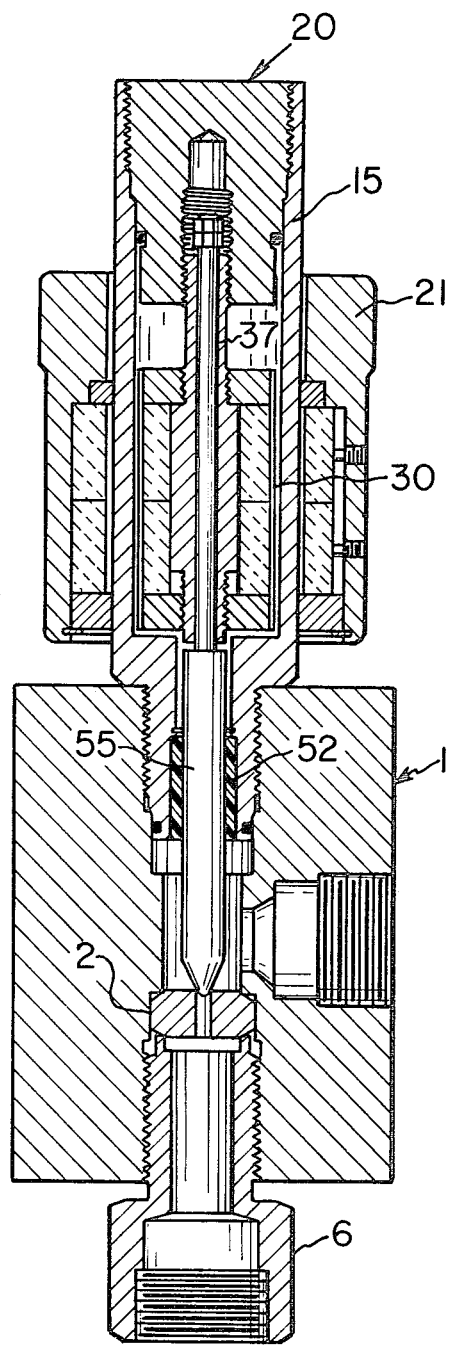

MAGNETICALLY ACTUATED RISING STEM VALVE

This application is a division of Ser. No. 39,899, May 17, 1979, now U.S. Pat. No. 4,274,444.

BACKGROUND

This invention relates to rising stem valves. These valves have a valve seat that separates an inlet and an outlet passage. The valve seat is arranged to receive a closure element. Extending away from the closure element is a valve stem that is actuated axially to open and close the valve by unseating and seating the closure element. Of course, an actuator passage must be provided in the valve body extending away from the valve seat. In conventional valve designs, the valve stem extends through the valve body and is actuated by elements connected to it outside of the valve body. The stem is surrounded by a ring of rings of packing that maintain the pressure within the valve.

This invention relates to magnetically actuated packless valves for high pressure applications. A related patent that pertains to a magnetically actuated valve, but not especially for high pressure applications, is U.S. Pat. No. 2,289,574. A more or less typical packed rising stem valve is illustrated in U.S. Pat. No. 3,269,698. Aspects of this invention relate to my own U.S. Pat. No. 4,106,825.

The known advantage of magnetically actuated valves is the elimination of the stuffing box or packing which has always been a drawback. However, in the past, magnetically actuated valves have been confined to relatively low pressures if at all used. The principal reason has been that sufficiently strong permanent magnets did not exist that would actuate the magnetic valve through the thick walls required to contain high pressures. Newly available permanent magnets permit the use of thicker walls in the valve housing providing the possibility of magnetically actuated valves for use at high pressures.

It is an object of this invention to provide a magnetically actuated valve for high pressures which will reliably open and close at minimal torques (applied by the drive magnets to the driven magnets) even at pressures in excess of 2000 psi. It is a further object to provide a magnetically actuated rising stem valve that is pressure tight at pressures exceeding 10,000 psi and which can be opened against a sealing pressure of over 10,000 psi. It is a further object of this invention to provide a magnetically actuated valve wherein the closure element floats relative to the stem and wherein relative motion therebetween opens or closes a pilot valve which being of smaller area than the main valve seat may be opened against the same pressure with much less force. It is yet another object of this invention to provide a magnetically actuated valve with a fail-safe manual override.

SUMMARY OF THE INVENTION

Briefly, according to this invention, there is provided a pressurizable (i.e., able to withstand pressures in excess of 2000 psi) valve body defining an annular seat between an inlet fluid passage and an outlet fluid passage. A valve actuator passage extends normal to the plane of the valve seat. A nonmagnetic tubular pressurizable bonnet is positioned coaxial with the actuator passage. In other words, the bonnet has an extending axis that passes through the space circumscribed by the annular valve seat. The bonnet attached to the valve body is in direct fluid communication with the actuator passage and with the inlet passage. A cylindrical holder is rotatably mounted upon the bonnet carrying rare earth cobalt magnets having an even number of north and south poles. A driven magnet assembly carrying rare earth cobalt magnets defining an even number of north and south poles is rotatably supported in the bonnet. Generally, the driving and driven magnets have the same number of magnetic poles with the same angular spacing. Typically the magnets may be cylindrical annular magnets with a plurality of equal spaced circumferential poles. Samarium cobalt is preferred.

A valve stem is positioned in the actuator passage and is preferably slidably journaled in a bushing fixed within the actuator passage. The stem has a closure element fixed to it and sized to be seated to thus interrupt flow through the valve. The valve stem is associated with the driven magnet assembly such that rotation of the driven magnet assembly in one direction moves the stem to open the valve and rotation of the driven magnet assembly in the other direction moves the stem to seat the closure element and thus close the valve.

According to one embodiment, the stem is threadably engaged within a threaded bore on the axis of the driven magnet assembly and is keyed to the valve body to prevent rotation of the stem relative to the valve body. Thus, when the driven magnet assembly is turned, the stem is either drawn into or forced out of the assembly which itself must be secured with thrust bearings within the bonnet.

According to another embodiment, the valve stem has threads that threadably engage threads in the valve body and/or the bonnet. The driven magnet assembly is keyed to the stem such that the stem turns with the assembly. In this embodiment, the assembly may be carried by the stem in which case no thrust bearings are required. Also, the stem may be keyed to the assembly for relative axial movement thus maintaining the alignment of the driving and driven magnets. When the driven magnet assembly turns, it also turns the stem causing it to move axially by the action of the threads that it engages. In a preferred embodiment the threads are on the end of the stem opposite the closure element and enter a threaded bore in an axial end plug in the bonnet.

According to a preferred embodiment, a floating valve closure element is arranged for restricted axial movement relative to said valve stem. In one case the stem slides into the closure element which has a bore that is coaxial with the stem to receive it. A pin extending out of the closure element enters an oblong groove in the stem to permit a slight amount of axial movement between the stem and the closure element. An axial bore in the closure element is arranged to be covered by the end of the valve stem when the stem moves toward the valve seat. When the stem is first lifted away from the seated closure element the small bore in the closure element is uncovered. This pilot valve action requires less force than to lift the entire valve off the valve seat at the same pressure. Once the pilot valve is opened the pressure drop across the valve seat is lowered enabling the closure element to be lifted from the seat with less force.

According to preferred embodiments, a fail-safe manually actuated system is provided for the actuation of the valve stem which system does not interfere with the normal magnetic actuation of the valve. Typically, the end of the bonnet away from the valve seat is comprised of inner and outer coaxial plugs being axially and/or rotationally movable relative to each other. The outer plug is annular and is threaded to the tubular portion of the bonnet. The inner plug has a center rod that extends up through a bore in the center of the outer plug. A pressure seal which may be a simple O-ring seals the inner and outer plugs. The exposed end may be threaded and arranged to be moved axially by a nut turned on the said threads. The nut is mounted between thrust bearing surfaces. The valve stem is connected to the inner plug such that movement of the plug moves the stem. In the case of the embodiment where the valve stem is threadably engaged in a bore within the end of the bonnet, the threaded bore for receiving the stem is on the inside face of the inner plug. In the case of the embodiment where the driven magnet assembly is mounted between thrust surfaces and the valve stem enters a threaded bore in the assembly, the inner plug is designed to be moved to threadably engage the assembly and then to threadably disengage the outer plug. Thereafter by turning the inner plug the driven magnet assembly can be rotated. This fail-safe embodiment may only be suitable for driving the stem in one direction. Generally, this fail-safe device would then be designed to drive the stem away from its normal position.

THE DRAWINGS

FIG. 1 is an illustration of an embodiment of this invention in which the valve stem threadably engages the driven magnet assembly.

FIG. 2 is an illustration of an embodiment of this invention in which the valve stem threadably engages the top of the bonnet.

DESCRIPTION OF THE PREFERRED EMBODIMENTS

Figure 3:
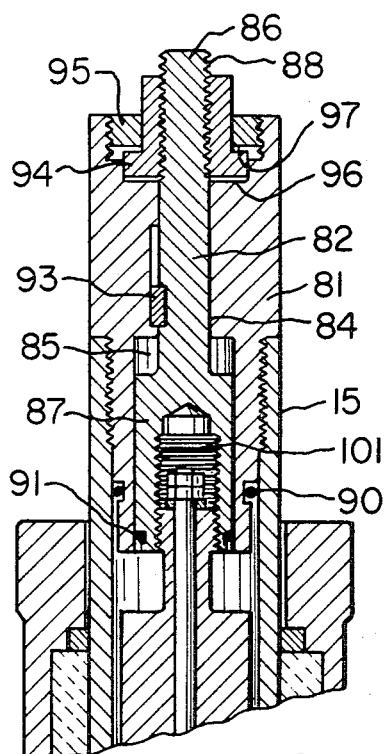
FIG. 3 is an illustration of a variation of the embodiment of FIG. 2 being provided with a fail-safe actuator.

Referring now to FIG. 1, the valve housing or body 1 includes three bores meeting at a central space. A removable valve seat 2 is positioned adjacent the intersection of the three bores. In this instance the outlet bore 3 is aligned with a valve actuator bore 4 both of which are at right angles to the inlet bore 5. Tubular boss 6 defines an outlet passage and has external threads 7 which engage the body 1 to hold the removable valve seat in place. Internal threads 8 on the outer end of boss 6 and threads 9 in the inlet bore enable the valve to be connected to the remainder of the pressurized system. It should be understood that the inlet and outlet bores may enter the valve body from almost any angle including angles in which they are aligned, and the particular embodiment in which the outlet bore is aligned with the actuator passage is especially for use with a removable seat. The valve body 1 and the boss 6 are preferably fabricated from 316 stainless steel or equivalent. The valve seat is metal and is an annular piece that is held between the inner end 12 of the boss 6 and the annular rim 13 at the inner end of the bore 3.

Secured to the valve body 1 is a tubular bonnet 15 having a portion 16 of small diameter with external threads for engaging the valve body 1 and a larger diameter portion 17 defining a magnetic drive housing. The bonnet must be a nonmagnetic steel or the like such as austenitic stainless steel. The end of the cylindrical housing of larger diameter has threadably fixed therein an end plug 20 described in more detail hereinafter.

Surrounding the housing is a drive magnet carrier 21 rotatably secured. The drive magnet carrier has mounted therein rare earth cobalt magnets 22,23 defining an even number of north and south magnetic poles. Preferably the magnets are annular magnets having an even number of equal angularly spaced circumferential north and south poles. In the embodiment illustrated annular bearings are wedged into the carrier, the bottom bearing 25 being held in place by a snap in retaining ring 26. The bearings are preferably a synthetic polymer material such as polytetrafluoroethylene.

A driven magnet assembly 30 is rotatably mounted within the bonnet 15. The driven magnet assembly comprises a center rod 31 to which are mounted rare earth cobalt magnets 22A, 23A. The magnets are annular and polarize as described above. The driven magnet assembly has axial end caps 32 and 33 threaded to the center rod. A thin nonmagnetic canister 34 extending between the end caps encapsulates the magnets. The end caps have annular portions of smaller diameter extending away from the magnets which are journaled in thrust bearings 40,41. The thrust bearings are of a synthetic polymer. The thrust bearings are held in place by annular bearing guides 42,43. The driven magnet assembly may turn freely and is not permitted axial movement.

A valve stem 51 is slidably journaled in a bushing 52 fixed in a central bore in the small diameter portion 16 of the bonnet. The bushing is of a synthetic polymer material and is held against a back rim by a snap ring. The valve stem 51 has an upper (considering the orientation of FIG. 1) threaded end 53 that enters a central threaded bore 36 in the driven magnet assembly. The other end of the stem slidably enters a tubular valve closure 60. The valve closure has a tapered lower external face 61 sized to mate with the valve seat. The tubular valve closure has a central bore 63 in which the valve stem is slidably journaled. A radial inlet opening 64 connects the central bore 63 with the inlet passage. A small bore 65 connects the central passage with the outlet passage when uncovered by the unthreaded end of the valve stem. The stem has an oblong opening 54 therethrough near the unthreaded end. A pin 67 fixed in the tubular closure walls passes through the oblong opening. Hence, the stem after a certain amount of movement relative to the closure carries the closure away from the valve seat. The stem carries the closure toward the valve seat by first moving relative to the closure enough to close off the small bore 65. Note that the lower end of the stem is tapered to engage the small bore. A keyway is provided on an outer surface of the closure element with a key 69 positioned therein to prevent rotation relative to the valve body. Note that by keying the closure element 60, the stem 51 is also prevented from rotating relative to the valve body as a result of the interaction of the oblong opening 54 and the pin 67.

In normal operation the valve is opened and closed by turning the carrier 21 that in turn causes rotation of the driven magnet assembly 30. The threaded interconnection between the driven magnet assembly and the stem 51 is converted to axial movement of the stem. If the valve has been seated, the pressure drop across the valve seat has been assisting in holding the closure 60 upon the seat 2. In high pressure systems this pressure drop when converted to axial unseating force can be very substantial. The unseating force may be too much for the magnetic drive to overcome considering the limited amount of torque that can be transferred magnetically even with rare earth cobalt magnets. For the first upward movement of the stem 51 it is not, however, required to overcome the unseating force for the entire valve but only for the pilot opening 65. After the pilot opening 65 is uncovered the pressure drop across the valve seat will be reduced. This enables the closure 60 to be unseated with less axial force and a corresponding smaller magnetically transferred torque.

Still referring to FIG. 1, the plug 20 is illustrated as comprised of at least two elements. An outer annular plug 71 has external threads 72 that enable it to be secured to the tubular bonnet 15. The annular plug has a central bore 73 extending entirely therethrough, there being a larger inside diameter portion of the bore facing the interior of the bonnet. Coaxial with the annular plug 71 is an inner plug 74 which passes through the annular plug and has an exposed end upon which a hand wrench may be placed to turn the inner plug. The inner plug 74 has a larger diameter portion positioned within the larger inside diameter portion of the bore. The inner plug is threaded up into the annular plug. The interior face of the inner plug has a threaded bore 75. Now in the event that magnetic force cannot be used to move the valve from its normal position, a wrench is used to turn the exposed end of the inner plug 74 which turns the plug down relative to the annular plug. The threads between the plugs are sized such that threads in the bore 75 engage the threads on the threaded extension 37 of the drive magnet assembly before the plugs are threadably disengaged. Thereafter continued turning of the inner plug will tighten it upon the threaded extension and eventually the driven magnet assembly will be turned to move the stem away from its normal position. The two plugs are sealed by an O-ring therebetween.

Referring now to FIG. 2, an alternate embodiment is illustrated wherein the stem is indirectly threaded at its end away from the valve seat to the plug 20 of the bonnet. In both FIG. 1 and FIG. 2 like elements carry identical identifying numerals. The stem 55 is of simpler design than with the embodiment of FIG. 1 as a smaller orifice is present in the valve seat 2. The stem itself also comprises the closure element. The stem is axially and rotatably fixed to the driven magnet assembly which has a threaded upper extension threaded into the bore on the interior face of the plug 20. When the drive magnet carrier 21 is turned, the drive magnet assembly 30 is turned thus turning the stem 55 and assembly 30 axially up or down depending on the direction of rotation. Preferably the stem is provided with clearances that permit upstream pressure from the inlet passage to act upon the upper axial end of the stem thus aiding in maintaining a tight seal when the valve is closed. Note that with this embodiment the driven magnet assembly is not mounted in thrust bearings. The axial load is thus carried by the bonnet through metal to metal contact, i.e. through the threads in the bore. Axial forces are not transferred to the bonnet through synthetic polymer bearings.

Referring now to FIG. 3, there is illustrated a fail-safe feature for the valves as described with reference to FIG. 2; that is, valves that have the stem or some extension thereof threadably engaging the plug in the top of the bonnet. The plug 20 comprises a threaded annular outer plug 81 and a coaxial inner plug 82 that is slidably journaled in the outer plug. The annular plug 81 is threaded into internal threads provided in the cylindrical wall of the bonnet 15. An O-ring seal 90 prevents leakage through the threads.

The outer plug 81 of the bonnet has a small diameter bore 84 extending its entire length and a larger diameter recess 85 from the interior face of the outer plug. The recess extends partly through the plug 81. The inner plug 82 has a shaft 86 that extends up through the small diameter bore 84 of the outer plug. Attached to the shaft 86 is a larger diameter part 87 of the inner plug that has an outer diameter slidably fitting with the larger diameter recess 85. An O-ring 91 provides a pressure seal between the recess and the larger diameter part.

The inner plug has a threaded bore 101 extending back from the interior face of the inner plug into which a threaded extension of the stem and driven magnet assembly is threadably engaged. The shaft 86 is keyed by key 93 to prevent relative rotation of the shaft and outer plug 81.

The shaft 86 extends up through the exterior surface of the outer plug 81 and has exposed external threads 88 thereon. A thrust washer 96 of synthetic polymer material is positioned over the exterior surface. An annular fitting 94 similar to a nut has internal threads that threadably engage the extended portion of the shaft 86. The fitting has a smaller diameter portion that extends away from the bonnet. Another annular fitting 95 with external threads is placed over the smaller diameter portion of fitting 94 and is threaded to the outer plug 81 with a thrust washer 97 of synthetic polymer material positioned between the two annular fittings. Thus the annular fitting with internal threads may rotate but cannot move axially relative to the bonnet. A wrench may be placed on the portion of fitting 94 that extends up above the fitting 95 and the fitting thus may be turned.

Under normal magnetic operation the valve operates as described for the embodiment of FIG. 2. If for some reason magnetic actuation is not possible, the annular fitting 94 can be turned. As it threadably engages the shaft 86 which is keyed to prevent rotation, this rotary motion is converted to axial motion of the valve stem. Thus the valve may be manually opened or closed as required.

Having thus defined our invention in the detail and particularity required by the Patent Laws, what is desired protected by Letters Patent is set forth in the following claims.

I claim:
1. A valve comprising
   a pressurizable valve body defining an annular valve seat, an inlet fluid passage in communication with one side of the valve seat and an outlet passage in communication with the other side of the valve seat, and a valve actuator passage extending away from the valve seat,
   a nonmagnetic tubular pressurizable bonnet having an extending axis passing through the space circumscribed by the annular valve seat and in direct fluid communication with the passages in said valve body,
   the end of the said bonnet away from the valve seat comprised of inner and outer coaxial plugs being axially movable relative to each other, said outer plug being threadably secured to the bonnet, a pressure seal between said plugs, means for preventing relative rotation between said plugs, a threaded axial bore in said inner plug opening to the interior of the bonnet, a cylindrical holder coaxial with and surrounding said tubular bonnet, said holder mounted rotatable thereto, said holder carrying rare earth cobalt magnets defining an even number of north and south poles, a driven magnet assembly carrying rare earth cobalt magnets defining an even number of north and south poles rotatably supported in the bonnet, a valve stem in the valve actuator passage threadably engaging the bore in said inner plug, a valve closure element fixed to said valve stem which when engaged in said valve seat prevents flow between the inlet and outlet passages, means for keying the valve stem to the driven magnet assembly such that rotation of the driven assembly rotates the stem and the stem moves into or out of the bore in said inner plug, whereby under normal conditions rotation of said driven magnet assembly in one direction raises the valve stem and rotation of said driven magnet assembly in the other direction lowers the valve stem, and means external to said bonnet attached to said inner plug for actuating axial movement of the valve stem by relative movement between said inner and outer plugs whereby under abnormal conditions the valve stem may be raised or lowered.

* * * * *